Dec. 10, 1968   L. A. PORTNOFF   3,415,540
OCCUPANT-PROPELLED PLAY VEHICLE
Filed Nov. 10, 1966   2 Sheets-Sheet 1

INVENTOR
LAWRENCE A. PORTNOFF
BY Sidney B. Ring
ATTORNEY

Dec. 10, 1968     L. A. PORTNOFF     3,415,540

OCCUPANT-PROPELLED PLAY VEHICLE

Filed Nov. 10, 1966     2 Sheets-Sheet 2

INVENTOR
LAWRENCE A. PORTNOFF
BY *Sidney B. Ring*
ATTORNEY

United States Patent Office 3,415,540
Patented Dec. 10, 1968

3,415,540
OCCUPANT-PROPELLED PLAY VEHICLE
Lawrence A. Portnoff, St. Louis, Mo. (% Sidney B. Ring, P.O. Box 6825, Brentwood, Mo. 63144)
Continuation-in-part of application Ser. No. 525,077, Feb. 4, 1966. This application Nov. 10, 1966, Ser. No. 593,370
5 Claims. (Cl. 280—221)

ABSTRACT OF THE DISCLOSURE

Play vehicle, for example a platform type play vehicle such as a skate board or scooter, capable of foot propulsion by occupant without pushing against the ground, having vehicle conveying means, such as wheels, activated by a toothed arm-gear assembly means for substantially immediate translation of motion from said toothed arm to said vehicle conveying means and means for substantially immediately moving said toothed arm of said toothed arm-gear assembly means, said means including at least one pedal.

---

This application is a continuation-in-part of my application Ser. No. 525,077, filed Feb. 4, 1966.

In general, this invention relates to a play vehicle.

This invention relates to a play vehicle, for example of the platform type, such as of the skate board or scooter type, and other types, which are capable of propulsion by a mechanical assembly contained therein. More particularly this invention relates to said vehicle which is activated by the occupant thereof such as by his foot.

Still more particularly, this invention relates to said vehicle containing a foot activated mechanical assembly of a toothed arm-gear assembly type for propelling said vehicle, particularly where the toothed arm and gear have a ratchet relationship.

Heretofore, when vehicles such as skate boards, scooters and the like have been employed, the rider propels the vehicle by means of keeping one foot on the vehicle and employing the other to push against the ground. Heretofore, no one has devised a mechanical assembly whereby propulsion could be effected on a non-hilly area while maintaining both feet on the vehicle.

I have now devised a play vehicle, for example of the platform type such as of the skate board or scooter type, and other types, which is capable of propulsion without pushing against the ground by employing a mechanical assembly which can be activated by the rider while maintaining both feet on the vehicle. Stated another way, the vehicle can be foot activated without pushing against the ground.

The invention will become apparent from the following illustrative description and accompanying drawing in which:

FIGURE 1 is a plan view of the scooter.

FIGURE 2 is a side elevational view of the scooter.

FIGURE 3 is an enlarged fragmentary plan view of the rear of the scooter frame from which the pedals and wheel have been removed in which the under section is presented in dotted lines.

FIGURE 4 is a rear end view of FIGURE 3.

FIGURE 5 is an enlarged fragmentary elevational side view of FIGURE 3 along lines b—b.

FIGURE 6 is an elevational side view of the rear wheel of the scooter.

Figure 1:
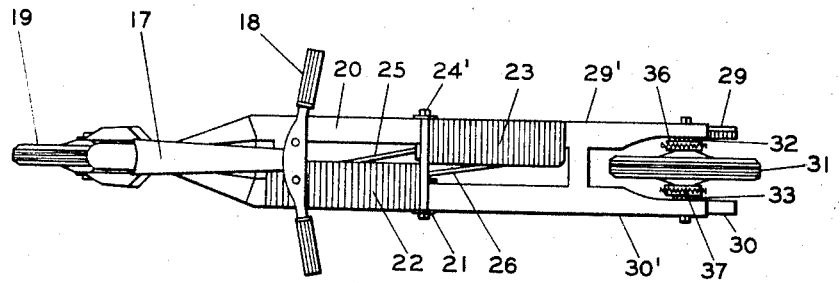
FIGURES 1 through 6 illustrate a scooter embodying the principles of this invention.
Figure 2:
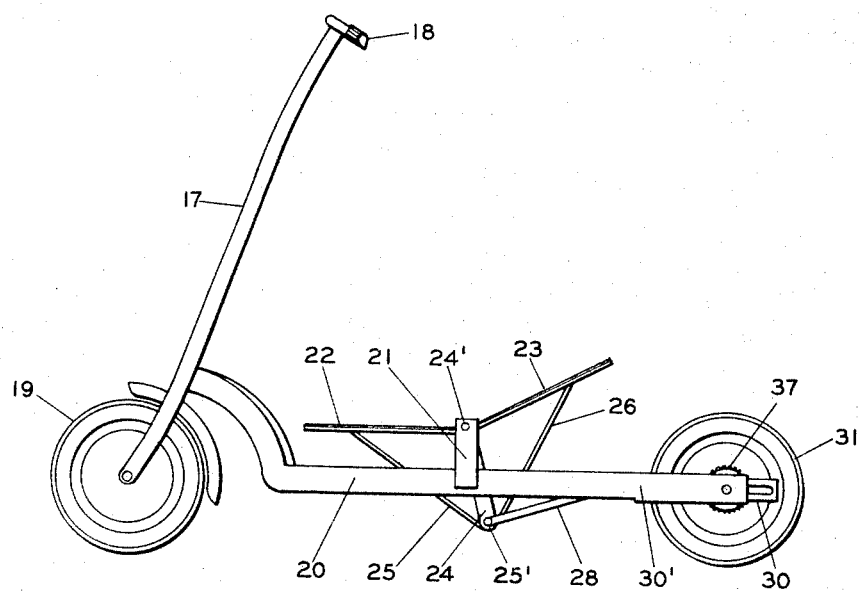
Figure 3:
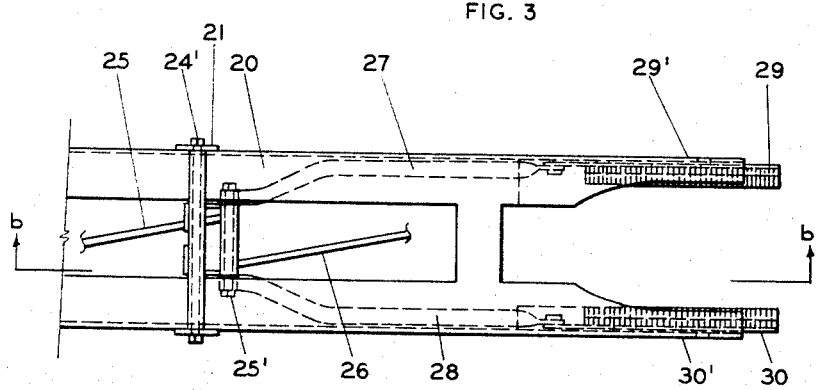
Figure 4:
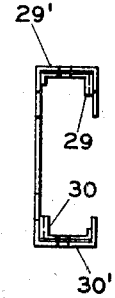
Figure 5:
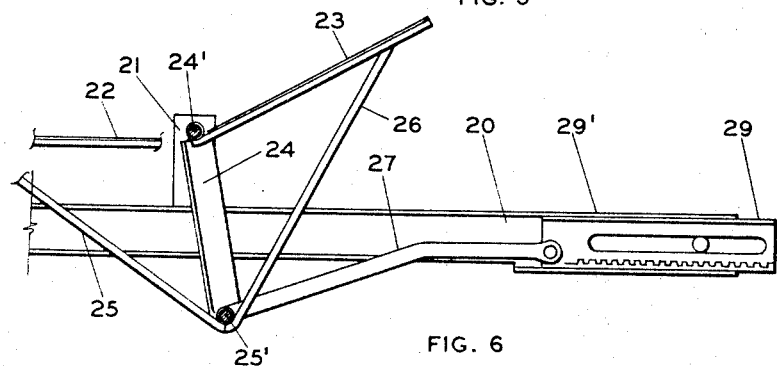
Figure 6:
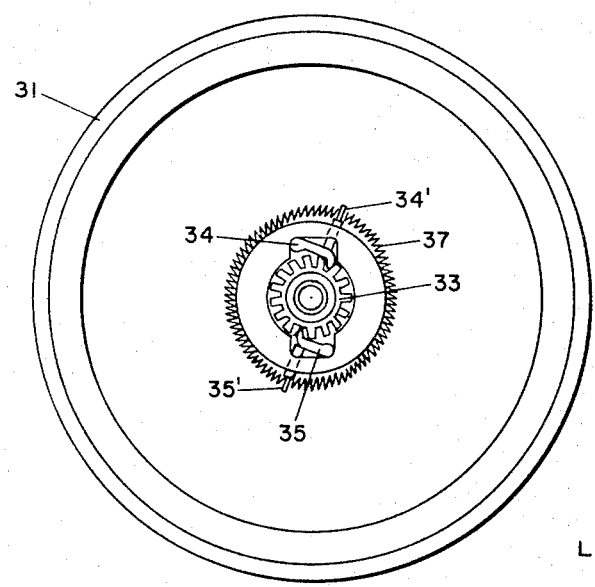

The structure and operation of a scooter embodying the present invention are presented in FIGURES 1 through 6.

In these figures, 17 is the front support for the handlebars, 18, 19 is the front wheel, 20 is the frame of the riding platform on which, raised by support 21, are dual pedals 22 and 23 which turn on pivot 24'. Action on pedals 22 and 23 through center drive bar 24 and angle bars 25 and 26 drives activating arms 27 and 28 back and forth through pivot bolt 25'.

These activating arms are connected to two toothed arms 29 and 30 supported in housings 29' and 30' on each side of the rear wheel 31. On the sides of the rear wheel are gears 32 and 33 which are in rack and pinion relationship with the toothed arms 29 and 30. The teeth of the arm face up in 29 and face down in 30. Each toothed arm and gear are in ratchet relationship so that motion is translated to the rear wheel in only one direction, due to the effect of ratchets 34 and 35. These ratchets are held in place by pins 34' and 35' due to the force exerted by springs 36 and 37. Because of the ratchet relationship, motion is translated in only one direction. Thus, as each toothed arm drives each gear, pedal action is translated to forward motion on the position stroke whereas no motion is translated on the return stroke. In the specific embodiment, one toothed arm translates motion on the positive stroke and the other toothed arm translates motion on the return stroke so that forward motion is effected with each stroke of the pedals. On the return stroke the toothed arm which had translated motion on the positive stroke, now passes over the gear without translating motion. By rocking these pedals back and forth forward motion is translated to the wheel of the scooter. The clicking sound of the ratchet adds noise appeal to the vehicle as a child's toy.

Although FIGURES 1 through 6 illustrate a scooter, the same or similar design as illustrated in FIGURES 1 through 6 can be employed as a skate board in which no handle is present. By standing on the skate board and rocking the pedals back and forth, motion is translated to the vehicle without depending on pushing against the ground.

In the preferred embodiment, a toothed arm is employed to activate a gear assembly in ratchet relationship to the toothed arm which in turn activates the wheels. One or more gears of various types may be employed. Thus, for example, one may employ spur gears, bevel gears, worm gearing, spiral gears, helical gears, chain gears, etc. One may also employ a series of gears so as to magnify mechanical effort therefor by modifying the gear ratios.

Whatever assembly is employed, by repeated action of the positive stroke, and neutral action on the return stroke, the occupant is able to accelerate the vehicle and to maintain the desired speed. A ratchet relationship is employed to engage the gear on the positive stroke and release the gear on the return stroke. The toothed arm may be returned to the original position by one or more devices such as a spring or a plurality of springs. The number of wheels on the vehicle may vary as desired and may have 3, 4, 5, 6, 7, 8, etc., wheels.

Having thus described my invention what I claim as new and desire to obtain by Letters Patent is:

1. A play vehicle having means including a front wheel and a rear wheel, said rear wheel activated by a toothed arm-gear assembly means for substantially immediate translation of motion to said rear wheel, said assembly means including two toothed arms supported in housing members on each side of said rear wheel, gear members in rack and pinion relationship with each of said toothed arms, the teeth of one of said toothed arms facing in a direction opposite to the direction of the teeth in said other toothed arm, ratchet means operatively associated with said toothed arms and gears for enabling the translation of motion to said rear wheel in a single direction, pin means for holding said ratchet means in position, and spring means operatively connected to said pin means for enabling said pin means to hold said ratchet means in position, and means for substantially immediately moving said toothed arms.

2. The play vehicle of claim 1 where the vehicle is of the platform type.

3. The play vehicle of claim 2 which is a scooter.

4. The play vehicle of claim 3 wherein said means for substantially immediately moving said toothed arms includes at least one pedal.

5. The play vehicle of claim 2 wherein said means for substantially immediately moving said toothed arms includes at least one pedal.

References Cited

UNITED STATES PATENTS

| | | | |
|---|---|---|---|
| 1,597,639 | 8/1926 | Von Glahn | 280—254 |
| 1,437,314 | 11/1922 | Jorgensen | 280—11.11 |
| 2,148,919 | 2/1939 | Winding | 280—221 |

FOREIGN PATENTS

| | | |
|---|---|---|
| 806,945 | 6/1951 | Germany. |
| 811,196 | 8/1951 | Germany. |

KENNETH H. BETTS, *Primary Examiner.*

U.S. Cl. X.R.

280—254